_United States Patent Office_

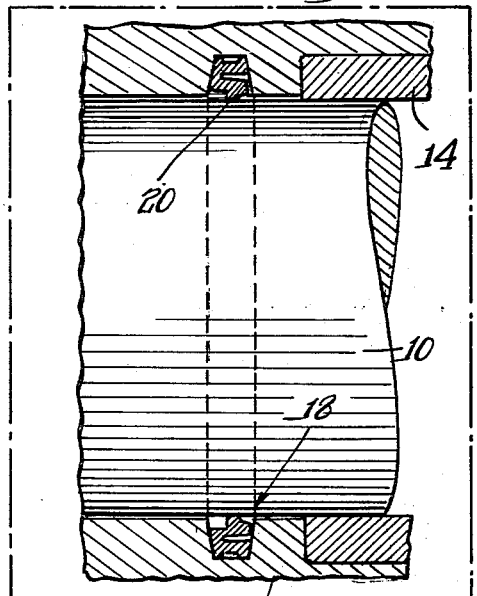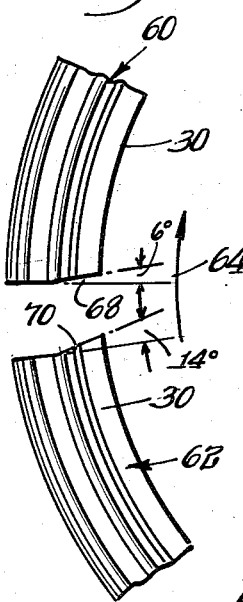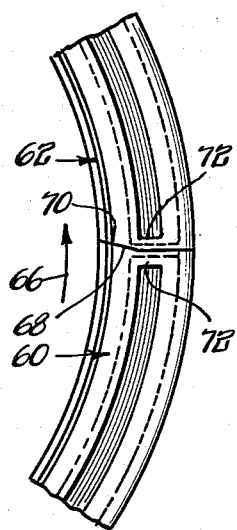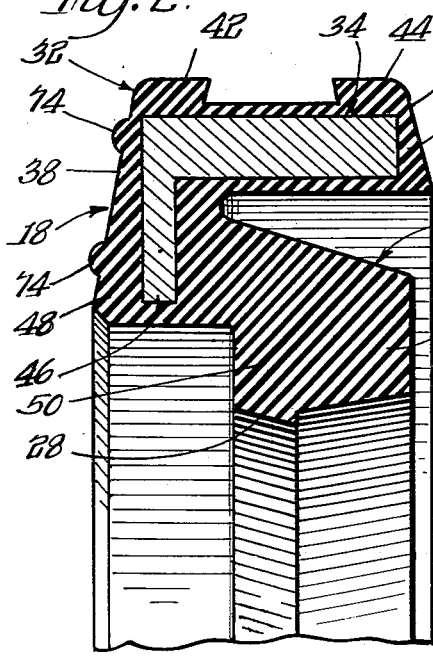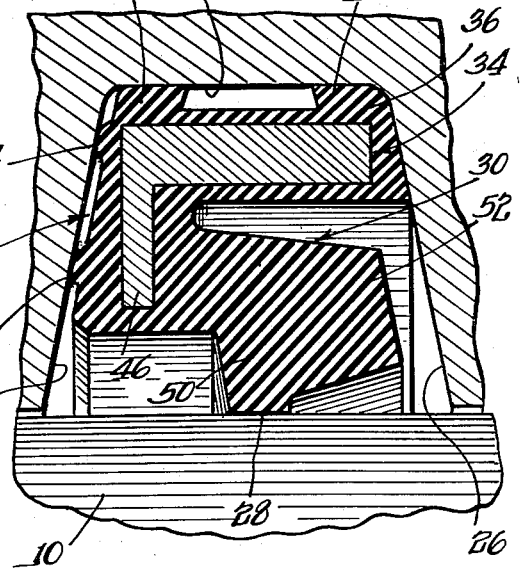
INVENTOR.
Joseph M. Liebig
BY: Olson & Trexler
attys.

3,117,796
Patented Jan. 14, 1964

3,117,796
OIL SEAL
Joseph M. Liebig, Wheaton, Ill., assignor to Illinois Milling, Inc., Chicago, Ill., a corporation of Illinois
Filed June 29, 1960, Ser. No. 39,648
1 Claim. (Cl. 277—205)

The present invention relates to means for sealing a rotary journal against the escape of fluid therealong, and is concerned more specifically with the provision of an oil seal adapted for sealing the journal of an internal combustion engine crankshaft.

One object of the invention is to provide, for sealing an internal combustion engine crankshaft journal or the like, a new and improved oil seal well adapted to be easily installed in encircling relation to a journal, and providing an inherent capability of producing a superior sealing action over a long service life.

Another object is to provide an improved oil seal ring of the character recited in the previous object having an improved construction which provides a superior and more effective sealing engagement of an annular sealing surface with a journal surface over a long service life.

Another object is to provide an oil seal ring of the character recited which supports an annular sealing surface in engagement with a journal in an improved manner which provides for radial yieldability of the sealing surface, and at the same time assures an optimum pressure engagement of the sealing surface with the journal which is evenly distributed over the area of the sealing surface.

A further object is to provide an improved oil seal ring, as recited in the previous objects, in which an annular journal sealing surface formed on a cantilevering sealing lip is urged radially into engagement with a journal and anchored against rotary movement by elastomeric sealing material having excellent wearing qualities in this service, and formed in a manner which provides for optimum engagement of the sealing surface with a coacting journal.

Another object is to provide a new and improved oil sealing ring of the character recited, which is adapted to be mounted in a shallow support groove and which has an improved construction that coacts with the groove structure to form an effective seal against the escape of fluid around the periphery of the sealing ring, even though the groove structure itself is imperfectly formed.

A further object is to provide an improved oil sealing ring, as recited in the above objects, which is well suited to be economically manufactured on a mass production basis, and well adapted to be quickly installed in coacting relation to a journal to be sealed.

Other objects and advantages will become apparent from the following description of the exemplary embodiment of the invention illustrated in the drawings, in which:

FIGURE 1 is a sectional view illustrating the sealing of an internal combustion engine crankshaft journal by an improved oil sealing ring forming the exemplary embodiment of the invention to be described;

FIG. 2 is a transverse sectional view on a greatly enlarged scale of the oil sealing ring of FIGURE 1;

FIG. 3 is a view of the oil sealing ring of FIG. 2, but showing the ring installed in a support groove in engagement with a rotary journal;

FIG. 4 is a fragmentary view showing coacting ends of two segments of the improved oil ring spaced from each other; and FIG. 5 is a view similar to FIG. 4, but taken from the opposite side of the ring and showing the ring segments in normal abutting engagement with each other.

Referring to the drawings in greater detail, FIGURE 1 illustrates the support of a crankshaft journal of an internal combustion engine 12 in the rear bearing 14 of the engine block structure 16.

The improved oil seal ring 18, forming the exemplary embodiment of the invention illustrated, is well adapted to be mounted in a simple annular support groove in the engine block structure 16, which groove need not be formed with precise dimensional accuracy.

Preferably, the groove 20 has a cylindrical bottom surface 22, FIG. 3, and two opposed side surfaces 24, 26 of truncated conical shape which diverge in a radially inward direction.

The journal 10 is sealed against the escape of oil along the surface of the journal by an annular sealing surface 28 of substantial width formed on the inner periphery of the oil seal ring 18, as shown in FIG. 2.

The journal engaging sealing surface 28 is supported in an improved manner which provides for radial enlargement of the sealing surface to conform to the diameter of the coacting journal, while at the same time providing assurance of optimum engagement of the sealing surface with the cylindrical surface of the journal.

When the sealing ring 18 is in its unstressed condition before being mounted in encircling relation to a journal, the sealing surface 28 has a slightly conical shape, as shown in FIG. 2.

The sealing surface 28 is integrally formed on a cantilevering sealing lip 30 which, by virtue of its construction and coaction with the structure of an annular body portion 32 of the sealing ring, provides a superior radial support to the sealing surface 28.

The ring body 32 is formed to have a generally L-shape, as viewed in transverse section, FIG. 2. The body is formed structurally by an annular metal reinforcing core 34, having an L-shape, as viewed in transverse section, and embedded in a resilient elastomeric material 36; such, for example, as silicone rubber or the like. The core 34 is sufficiently massive to form at least one-half of the volume of the body 32.

The sides of the body 32 at the two axial ends of the ring 16 define two slightly conical side surfaces 38, 40 adapted to fit against opposite sides of a support groove 20, of the character described. Two annular ledges 42, 44, on the body 32 protrude radially outward to fit against the bottom surface 22 of a support groove, as shown in FIG. 3.

An annular leg 46 on the core 34 extends radially inward adjacent the side surface 38 of the ring. This leg provides firm support to an inwardly projecting annular portion 48 of the elastomeric body structure 36 which provides a highly advantageous support to the cantilevering sealing lip 30 which is formed integrally with the elastomeric body structure.

Integrally joined to the elastomeric body structure 48 encasing the core leg 46, the previously mentioned sealing lip 30 cantilevers away from the inwardly projecting body portion 48 a substantial distance along the axis of the ring.

The cantilevering annular lip 30 has substantial thickness at its supported edge, and hence, substantial resistance to radial flexure. Beginning a short distance outwardly from its supported edge, the sealing lip 30 is sharply thickened radially to project radially inward and form a relatively massive sealing surface support annulus 50.

The shaping of the structure is such that the sealing surface 28 is located in a position along the axis of the sealing ring which is substantially closer to the supported edge of the sealing lip 30 than it is to the distal or projecting edge of the sealing lip. Thus, only a relatively short portion of the lip 30 intervenes between the sealing surface 28 and the supported edge of the lip 30. Moreover, the enlarged annulus 50 on the sealing lip 30 includes a heavy rim portion 52 of the annulus which is located at the distal edge of the lip beyond the sealing surface 28.

This construction is of advantage in providing optimum support to the sealing surface 28 when it is engaged with a journal 10, as illustrated in FIG. 3. The lip 30 is formed of the same elastomeric material as the body structure 36, and hence has a flexible quality which provides for radial enlargement of the surface 28 to accommodate the journal 10. As the lip 30 flexes radially outward, the surface 28 assumes a cylindrical form which fits snugly against the journal surface.

The sealing surface 28 is urged radially toward the journal 10 by three sources of support. One is the structural portion of the annulus 50 lying radially outward of the surface 28. Another is the bending moment in the cantilevering lip as it is yieldably anchored to the leg 46. The third source of yieldable support is the support arising from tension in the tension rim portion 52 of the annulus 50, which lies axially beyond the sealing surface 28. The first mentioned source of radial support for the surface 28 is, of course, in axial alinement with the surface. The second and third sources of radial support lie on opposite sides of the sealing surface 28 and effectively balance each other. The result is to distribute the radial force on the surface 28 across the full width of the sealing surface to hold it in extremely effective sealing engagement with the journal over a long service life.

Convenient assembly of the sealing ring 18 in a mounting groove 20 in encircling relation to a journal 10 is facilitated by forming the ring in two semicircular half segments 60, 62, FIGS. 4 and 5. Opposite ends of the adjacent body portions of the two ring segments terminate abruptly, as in FIG. 4, to fit in abutting engagement with each other, as shown in FIG. 5.

The direction of rotation of a journal in relation to the ring segments is indicated by the arrows 64, 66, in FIGS. 4 and 5. At the leading end of each ring segment, that is, the end which opposes the direction of rotation of the journal, the sealing lip 30 defines an end face 68 which extends from the ring body toward the center of the ring at an angle which is turned approximately 6 degrees in a trailing direction in relation to a radial line through the surface 68, as indicated in FIG. 4. At the opposite or trailing end of each ring segment, the sealing lip 30 defines an end face 70 which extends from the ring body toward the center of the ring at an angle which is turned fourteen degrees in a trailing direction away from a radial line through the surface 70, as indicated in FIG. 4.

When the two ring segments 60, 62 are assembled in abutting relation to each other, the opposing lip faces 68, 70 firmly engage each other to prevent leakage of oil therebetween.

At each end of each ring segment 60, 62 the cantilevering sealing lip 30 is joined to the body portion of the ring segment by a radial web 72, as shown in FIG. 5.

As shown, two annular beads 74 are formed on the body of the oil seal to project outwardly from the side surface 38 into sealing engagement with the opposing groove surface 24.

It will be appreciated that the invention is not necessarily limited to use of the exact structure illustrated, but includes the use of variants within the scope of the invention as defined by the claim.

The invention is claimed as follows:

A fluid seal adapted to seal the space between a rotating shaft and a fixed housing having an annular groove opening radially inwardly, and comprising an annular body formed of resilient material and adapted to seat in the annular groove in a leak-tight and non-rotative fit, an annular reinforcing member internally stiffening said body and including a circumferentially extending flange projecting radially inwardly from the body, an annular lip integral with the body and including a relatively large base portion forming one axial end of said lip and in which said flange is imbedded for stiffening and being substantially radially coextensive therewith, and said lip extending generally axially from the base portion and provided with a relatively massive free end portion forming the end of a cantilever from said base portion, an axial sealing surface projecting radially inwardly from said lip intermediate the ends thereof and located relatively closely adjacent the base portion of the lip and said flange for reducing the effective lever arm between said surface lip and said base portion and increasing the radial force applied to the sealing surface when the seal is applied to a shaft with the free end portion of the lip under tension resulting from stretching thereof to assist in distributing the radial forces over the entire surface extent of the sealing surface.

References Cited in the file of this patent

UNITED STATES PATENTS

| | | |
|---|---|---|
| 1,976,797 | Naylor | Oct. 16, 1934 |
| 2,173,247 | Bott | Sept. 19, 1939 |
| 2,697,623 | Mosher | Dec. 21, 1954 |
| 2,719,743 | Brummer et al. | Oct. 4, 1955 |
| 2,729,481 | Chambers et al. | Jan. 31, 1956 |